United States Patent
Togashi

[11] 3,982,257
[45] Sept. 21, 1976

[54] MEANS FOR ENABLING STOPPED-DOWN MEASUREMENT IN EXPOSURE CONTROL CAMERA EMPLOYING FULL-APERTURE MEASURING SYSTEM

[75] Inventor: Shiyuichi Togashi, Tokyo, Japan

[73] Assignee: Fuji Photo Optical Co., Ltd., Omiya, Japan

[22] Filed: Aug. 18, 1975

[21] Appl. No.: 605,232

[30] Foreign Application Priority Data
Aug. 19, 1974  Japan .......................... 49-98354[U]
Aug. 19, 1974  Japan .......................... 49-98356[U]

[52] U.S. Cl. .............................. 354/286; 354/270
[51] Int. Cl.[2] ..................... G03B 9/06; G03B 7/00
[58] Field of Search .......... 354/286, 272, 202, 228, 354/232, 270; 350/252, 257

[56] References Cited
UNITED STATES PATENTS

| | | |
|---|---|---|
| 2,845,013 | 7/1958 | Schütz .............................. 354/272 |
| 2,967,472 | 1/1961 | Gebele .............................. 354/228 |
| 3,710,706 | 1/1973 | Sanada .............................. 354/270 |
| 3,722,390 | 3/1973 | Schlapp et al. .................... 354/270 |
| 3,849,785 | 11/1974 | Schulze .......................... 354/286 X |
| 3,858,225 | 12/1974 | Hasegawa et al. ............... 354/286 X |

Primary Examiner—Donald A. Griffin

[57] ABSTRACT

In a single lens reflex camera having a full-aperture measurement type exposure control circuit, a diaphragm interlocking ring which is connected with a variable resistor to control the exposure control circuit in accordance with the diaphragm is provided. An interchangeable lens having a manually operable diaphragm control ring or an intermediate ring to be interposed between the camera body and the interchangeable lens has a pin to be engaged with the diaphragm interlocking ring and to move the ring up to the full-aperture position when the lens is mounted to the camera body.

7 Claims, 4 Drawing Figures

MEANS FOR ENABLING STOPPED-DOWN MEASUREMENT IN EXPOSURE CONTROL CAMERA EMPLOYING FULL-APERTURE MEASURING SYSTEM

BACKGROUND OF THE INVENTION

1. Field of the Invention

This invention relates to means for enabling stopped-down measurement in a single lens reflex camera provided with a full-aperture measuring system when an interchangeable lens having a manually controlled diaphragm or an interchangeable lens having a preset diaphragm ring with a lens mount of different type from that of the camera is mounted to the camera.

2. Description of the Prior Art

In a single lens reflex camera provided with an automatic exposure control means of TTL type (wherein light passing through the taking lens is measured) which is capable of performing full-aperture measurement, a diaphragm interlocking member which is engaged with a preset diaphragm ring of the interchangeable lens is provided. The diaphragm interlocking member is connected with a variable resistor in an automatic exposure control circuit so that the resistance of the variable resistor may be changed in accordance with the position of the preset diaphragm ring indicative of the diaphragm value to which the diaphragm is to be stopped down in response to the shutter release operation. Thus, the measurement of the scene brightness can be performed with reference to the diaphragm value which will actually effect in the photographying operation even without actually stopping down the diaphragm to such a value. Namely, a full-aperture measurement can be conducted by use of the above system employing the diaphragm interlocking member.

In the above described type of single lens reflex cameras, it is impossible to make a stopped-down measurement when an interchangeable lens having a manually operable diaphragm control ring or an interchangeable lens having a lens mount of different type from that of the camera body is mounted to the camera. In case where a lens having a different type of lens mount from that of the camera body is desired to be mounted to the camera, a connecting attachment is interposed between the lens and the camera body. When the connecting attachment is interposed between the lens and the camera body, the diaphragm interlocking member cannot be connected with the preset diaphragm ring and accordingly it becomes impossible to conduct a full-aperture or stopped-down measurement.

SUMMARY OF THE INVENTION

In view of the above described observations of the prior art, it is the primary object of the present invention to provide a means for enabling a stopped-down measurement in a single lens reflex camera provided with an automatic exposure control system of full-aperture measurement type when an interchangeable lens having a manually controlled diaphragm or a lens mount of different type from that of the camera is mounted to the camera body.

Another object of the present invention is to provide a means for enabling a stopped-down measurement in a single lens reflex camera provided with an automatic exposure control system of full-aperture measurement type when an interchangeable lens is mounted to the camera body by way of an intermediate ring.

Other objects and advantages of the present invention will be made apparent from the detailed description of the preferred embodiments thereof taken in conjunction with the accompanying drawings.

In accordance with the present invention, a pin is fixed to the lens or the attachment so that the pin may be engaged with the diaphragm interlocking member in the camera and move the same in the direction to the full-aperture position when the lens is rotated to be fixed to the camera body. Thus, the resistance of the variable resistor in the exposure control circuit is set to be in the full aperture side and it is made possible to conduct a stopped-down measurement by manually operating a manual diaphragm control ring or a preset diaphragm ring.

DESCRIPTION OF THE PREFERRED EMBODIMENTS

Figure 1:
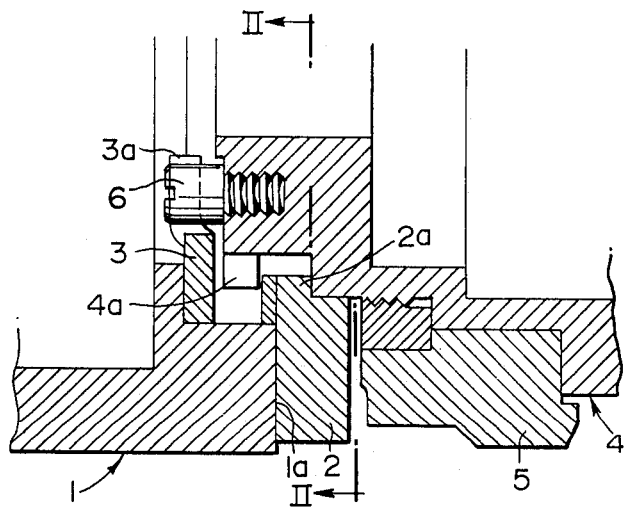
FIG. 1 is a partial longitudinal sectional view which shows the details of one embodiment of the means in accordance with the present invention.
Figure 2:
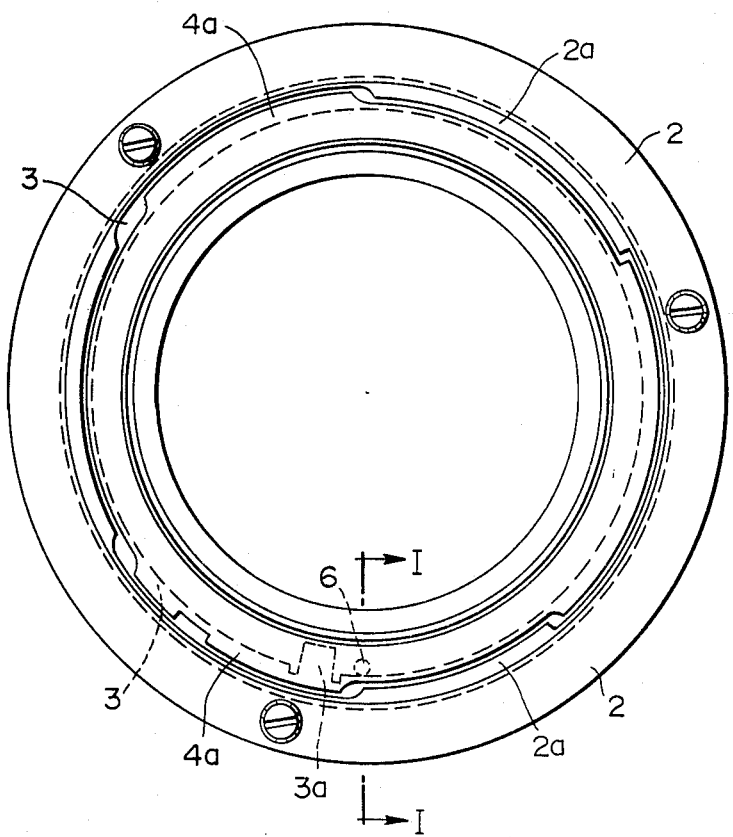
FIG. 2 is a front view showing the mount of the camera together with the mount of the lens in the state where the lens mount is just put into the camera mount.
Figure 3:
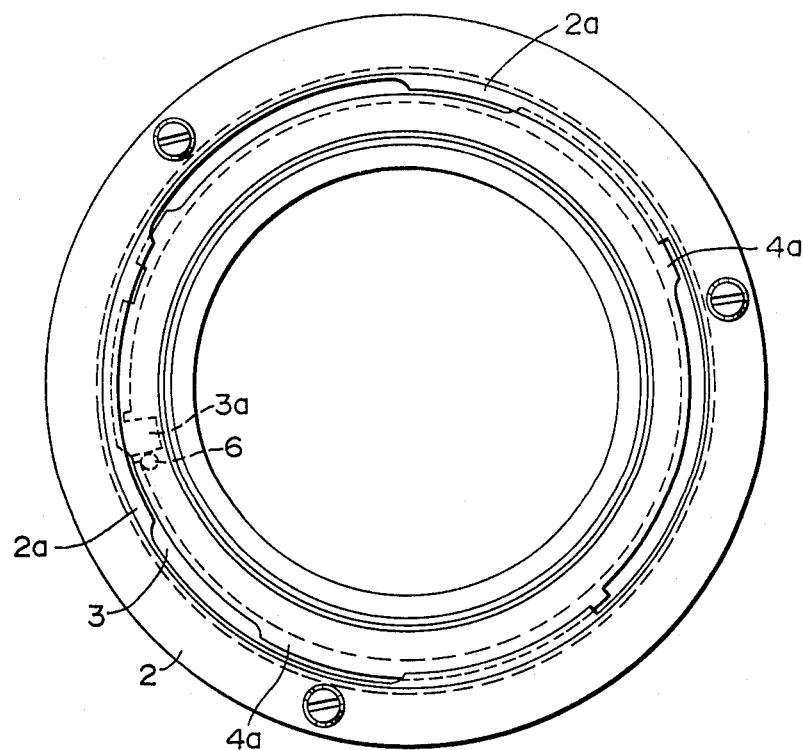
FIG. 3 is a front view showing the mount of the camera together with the mount of the lens in the state where the lens mount is engaged with the camera mount and a diaphragm interlocking member in the camera is moved to the full-aperture position.

FIGS. 1 to 3 show an embodiment of the means in accordance with the present invention. On the end face 1a of a camera body 1 is fixed a bayonet ring 2 having bayonet engaging portions 2a. In the camera body 1 behind the bayonet ring 2 is rotatably mounted a diaphragm interlocking member 3 which is connected with a variable resistor (not shown) in an exposure control circuit of full-aperture measurement type in the camera for controlling the resistance by rotation thereof. The diaphragm interlocking member 3 has a radially extending projection 3a to be engaged with a diaphragm preset member of a interchangeable lens having a preset member for moving the diaphragm interlocking member to the position indicative of the preset diaphragm value.

In the embodiment shown in FIGS. 1 to 3, an interchangeable lens 4 with a manually operable diaphragm control ring 5 is mounted to the camera body 1. The lens 4 has on its end face bayonet engaging portions 4a to be engaged with the bayonet engaging portions 2a of the bayonet ring 2. The lens 4 further has on its end face a pin 6 fixed thereto and engaged with the radially extending projection 3a of the diaphragm interlocking member 3.

When the lens 4 is put into the camera body 1 as shown in FIG. 2, the pin 6 is separated from the projection 3a of the member 3. Then, as the lens 4 is rotated to make the engaging portions 4a of the lens 4 be engaged with the engaging portions 2a of the bayonet ring 2, the pin 6 pushes the projection 3a to bring the projection 3a to the position shown in FIG. 3 rotating the interlocking member 3. By the rotation of the diaphragm interlocking member 3 up to the position shown in FIG. 3, the resistor of the exposure control circuit is set to be in the full-aperture side. Therefore, it becomes possible to conduct a stopped-down measurement by rotating the manually operable diaphragm control ring 5.

Further, as will be understood by the above description, the diaphragm interlocking member 3 is spring-biased in the counterclockwise direction in FIGS. 2 and 3 as in the conventional camera of full-aperture measuring system.

Although in the above described embodiment of the invention the lens 4 is directly mounted to the camera body 1, it will be noted that the interchangeable lens 4 may be mounted to the camera body 1 by way of an intermediate ring, a contact photographying ring or other kind of attachment.

Futher, it will be understood that the bayonet mount employed in the above embodiment is not indispensable, but a screw mount for example can be employed instead thereof.

Figure 4:
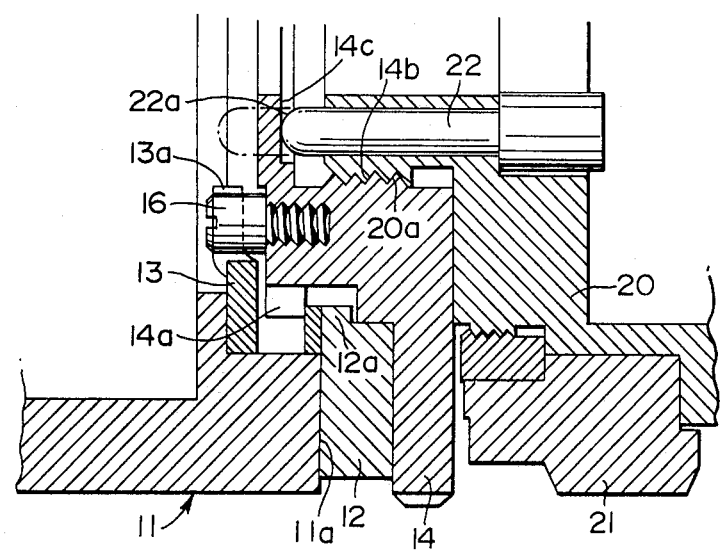
FIG. 4 is a partial longitudinal sectional view which shows the details of another embodiment of the means in accordance with the present invention.

A second embodiment of the means in accordance with the present invention is shown in FIG. 4 wherein an intermediate ring 14 is interposed between a lens 20 and a camera body 11 and the lens 20 is provided with a preset diaphragm ring 21 for making a preset of the diaphragm in the full-aperture measuring system. In this invention, by use of the intermediate ring 14, a stopped-down measurement can be accomplished with the lens 20 having a preset diaphragm ring. Further, the interchangeable lens employed in this invention has a screw mount and is mounted to a camera body with a bayonet mount by use of the intermediate ring 14.

Referring to FIG. 4, on the end face 11a of the camera body 11 is fixed a bayonet ring 12 having bayonet engaging portions 12a. In the camera body 11 behind the bayonet ring 12 is rotatably mounted a diaphragm interlocking member 13 which is connected with a variable resistor (not shown) in an exposure control circuit in the camera for controlling the resistance by rotation thereof. The diaphragm interlocking member 13 has a radially extending projection 13a to be engaged with a diaphragm preset member of an interchangeable lens having a preset member directly mounted to the camera so that the diaphragm interlocking member 13 may be moved to the position indicative of the preset diaphragm value.

In the embodiment shown in FIG. 4, an interchangeable lens 20 with a preset diaphragm ring 21 is mounted to the camera body 11 with the intervention of an intermediate ring 14. The intermediate ring 14 has a screw 14b on the internal periphery thereof and a bayonet engaging portions 14a on the end face thereof. The bayonet engaging portions 14a are engaged with the bayonet engaging portions 12a of the camera body 11 and the screw 14b is engaged with a screw 20a of the interchangeable lens 20 so that the lens 20 may be mounted to the camera body 11 thereby. The intermediate ring 14 has on its end face a pin 16 fixed thereto and engaged with the radially extending projection 13a of the diaphragm interlocking member 13. The lens 20 is further provided with a stop-down pin 22 slidable in the direction of the axis of the lens. The stop-down pin 22 works in such a way that the diaphragm (not shown) can be stopped down by the rotation of the preset ring 21 only when the stop-down pin 22 is pushed in as shown in FIG. 4. When the stop-down pin 22 is not pushed down as indicated by a chain line in FIG. 4, the diaphragm cannot be stopped down even if the ring 21 is rotated.

The intermediate ring 14 has an abutment portion 14c on which the tip end 22a of the stop-down pin 22 abuts when the lens 20 is screwed to the ring 14 as shown in FIG. 4. Therefore, when the interchangeable lens 20 is mounted to the intermediate ring 14 which is mounted to the camera body 11, the stop-down pin 22 is pushed in and the diaphragm (not shown) is put into the state where the diaphragm can be stopped down by operating the preset ring 21.

Similarly to the first embodiment described with reference to FIGS. 1 to 3, the diaphragm interlocking member 13 is rotated to the full-aperture position by rotating the intermediate ring 14 to secure the same to the camera body 11 by means of a bayonet engaging system. The relation between the pin 16 and the projection 13a is quite the same as that between the pin 6 and the projection 3a in the first embodiment as shown in FIGS. 2 and 3, and accordingly, the description thereof is omitted here.

Thus, the resistance of the variable resistor of the exposure control circuit is automatically put into the full-aperture state and the diaphragm in the lens can be stopped down manually by rotating the preset ring. Therefore, it becomes possible to conduct the stopped-down measurement in the camera.

I claim:

1. In a photographic single lens reflex camera provided with a full-aperture measurement type exposure control device and having a diaphragm interlocking member which is connected with a variable resistor to control the exposure in accordance with information concerned with the diaphragm, means for enabling stopped-down measurement when an interchangeable lens is mounted to the camera body comprising a first mount means formed on the end face of the camera body, a second mount means formed on the end face of the interchangeable lens to be engaged with said first mount means for securing the lens to the camera body by rotating the lens, a pin fixed to the lens and brought into engagement with the diaphragm interlocking member to move the diaphragm interlocking member to a full-aperture position when the lens is rotated to be secured to the camera body, and a diaphragm operating member provided in the interchangeable lens which is manually operable to stop down the diaphragm.

2. Means for enabling stopped-down measurement in a single lens reflex camera provided with a full-aperture measurement type exposure control device as defined in claim 1 wherein said first and second mount means are of bayonet type.

3. Means for enabling stopped-down measurement in a single lens reflex camera provided with a full-aperture measurement type exposure control device as defined in claim 1 wherein said diaphragm operating member is a manually operable diaphragm control ring for directly varying the size of aperture of the diaphragm.

4. In a photographic single lens reflex camera provided with a full-aperture measurement type exposure control device and having a diaphragm interlocking member which is connected with a variable resistor to control the exposure in accordance with information concerned with the diaphragm, means for enabling stopped-down measurement when an interchangeable lens is mounted to the camera body with the intervention of an intermediate member comprising a first mount means formed on the end face of the camera body, a second mount means formed on the end face of the intermediate member to be engaged with said first mount means for securing the intermediate member to the camera body by rotation thereof, a third mount means formed on the other end of the intermediate member, a fourth mount means formed on a part of the interchangeable lens to be engaged with said third mount means for securing the lens to the intermediate member by rotation thereof, a pin fixed to the intermediate member and brought into engagement with the diaphragm interlocking member to move the diaphragm interlocking member to a full-aperture position when the intermediate member is rotated to be secured to the camera body, and a diaphragm operating member provided in the interchangeable lens which is manually operable to stop down the diaphragm.

5. Means for enabling stopped-down measurement in a single lens reflex camera as defined in claim 4 wherein said first and second mount means are of bayonet type.

6. Means for enabling stopped-down measurement in a single lens reflex camera as defined in claim 4 wherein said third and fourth mount means are of screw mount type.

7. Means as defined in claim 4 further comprising a stop-down pin axially slidable in the lens which allows direct control of the diaphragm in the lens by said diaphragm operating member when slid in the direction apart from the camera body, and an abutment portion formed on said intermediate member so that the stop-down pin abuts on the abutment portion and is moved in said direction to allow direct control of the diaphragm when the lens is mounted to the intermediate member, whereby the diaphragm in the lens is made directly controllable by operating said diaphragm operating member.

\* \* \* \* \*